United States Patent [19]

Paoletti

[11] Patent Number: 4,735,133

[45] Date of Patent: Apr. 5, 1988

[54] MILK HEATING AND EMULSIFYING DEVICE ESPECIALLY FOR THE PREPARATION OF THE HOT DRINK KNOWN AS "CAPPUCCINO"

[75] Inventor: Luciano Paoletti, Florence, Italy

[73] Assignee: Fulmine S.r.L., Florence, Italy

[21] Appl. No.: 791,581

[22] Filed: Oct. 25, 1985

[30] Foreign Application Priority Data

Oct. 26, 1984 [IT] Italy .................... 9521 A/84

[51] Int. Cl.[4] ............ A23C 9/00; A23F 5/00; A23L 2/26
[52] U.S. Cl. .................... 99/454; 99/275; 99/323.1; 99/452; 239/427.3; 261/DIG. 7; 366/101; 366/139; 366/176; 366/341
[58] Field of Search ............... 99/323.1, 323.2, 323.3, 99/452, 453, 454, 483; 366/101, 176; 222/1, 145; 239/113, 427.3, 427.5, 427; 261/DIG. 7, 121 R

[56] References Cited

U.S. PATENT DOCUMENTS

| | | | |
|---|---|---|---|
| 376,496 | 1/1888 | Von Roden | 99/454 |
| 1,406,380 | 2/1922 | Heath et al. | 99/453 X |
| 2,126,625 | 8/1938 | Eggleston | 99/454 X |
| 2,391,422 | 12/1945 | Jackson | 239/427.5 |
| 2,521,334 | 9/1950 | Boerstra | 366/101 |
| 3,424,547 | 1/1969 | Winniett | 99/323.3 |
| 4,466,342 | 8/1984 | Basile et al. | 99/323.1 |
| 4,552,286 | 11/1985 | Kuckens et al. | 239/113 |
| 4,595,121 | 6/1986 | Schultz | 222/1 |

*Primary Examiner*—Timothy F. Simone
*Attorney, Agent, or Firm*—Fleit, Jacobson, Cohn & Price

[57] ABSTRACT

A device for heating and emulsifying milk, especially to prepare a white coffee drink known as "cappuccino" with the assistance of a steam jet, which has a vacuum chamber surrounding a nozzle and formed with an emulsion discharge port, a passageway for admitting sucked-in air, and at least one passageway for the milk which enters the chamber on account of the negative pressure prevailing therein, thereby milk, air, and steam are mixed together in said chamber and then made to flow out through said discharge port.

12 Claims, 2 Drawing Sheets

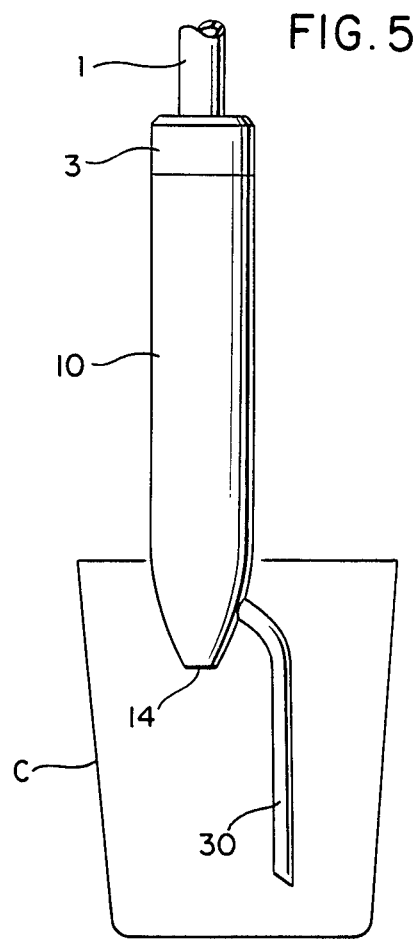
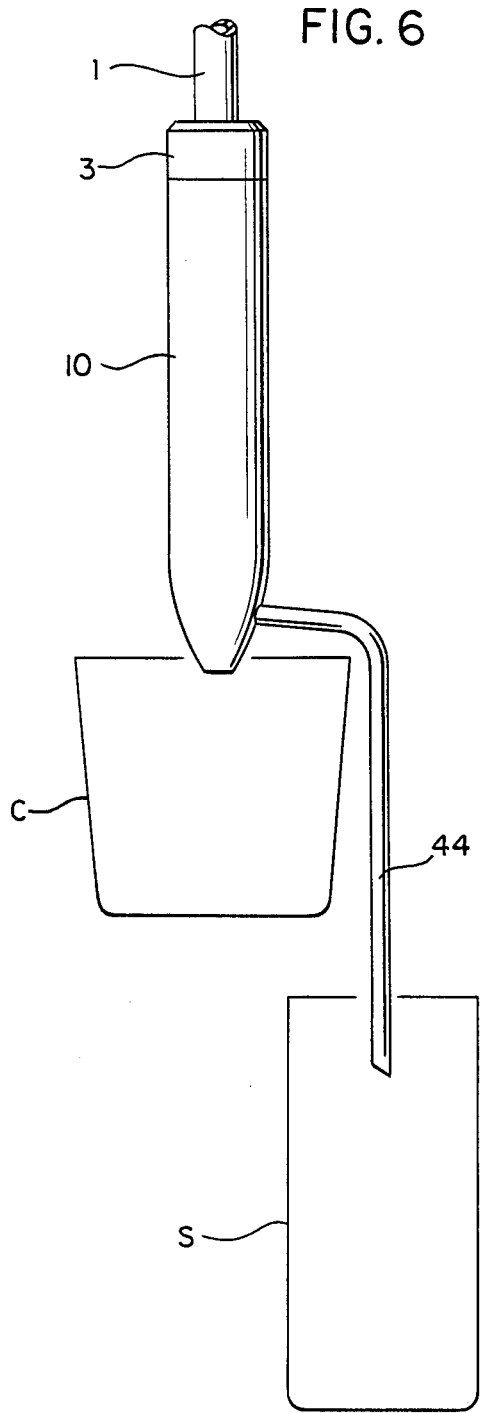

MILK HEATING AND EMULSIFYING DEVICE ESPECIALLY FOR THE PREPARATION OF THE HOT DRINK KNOWN AS "CAPPUCCINO"

BACKGROUND OF THE INVENTION

This invention relates to a device, specially intended for household application but also adapted for professional use at public spots, for heating and emulsifying milk and air, which may be variously used and in particular used to prepare such a hot drink as the so-called "cappuccino", which is a mixture of coffee infusate and milk particularly emulsified with air particles. Heat is applied by the injection of steam, whereupon milk is also emulsified. For this purpose, it is necessary that, by the suction effect of the steam from the nozzle, air be drawn in for introduction through the liquid phase milk along with the steam, which air stays in gaseous emulsion with the milk, whereas the steam heats the milk and is either condensed therein or dispersed.

The operator is currently required to find out optimum location of the steam nozzle and the level of the liquid phase milk in order to bring about an appropriate inflow of air and break it up, and to achieve proper metering of the air to be emulsified with the milk. It is frequently expedient to perform a cyclic relative movement of the milk container up and down with respect to the steam nozzle, so as to achieve a desired emulsifying effect; the operation requires skilful handling to prevent objectionable, and occasionally hazardous, splashes of milk and steam leakouts.

Where operations of this kind are to be performed in a house environment, using small household appliances for "espresso" coffee making, the problem is made more complicated by the operator possessing no special experience on the matter, and because in the house very small unit amounts of milk, and hence, small-size containers are apt to be used, which increases the risk of splashing out.

SUMMARY OF THE INVENTION

This device is intended for heating and emulsifying milk, both on public spot machines and machines of the domestic types, and is directed to simplify such operations as mentioned above and issue unfailingly good results even where no skilled operators are available.

The device of this invention comprises essentially a vacuum chamber encircling the nozzle and having an emulsion discharge port, an air intake passageway, and at least one passageway for the milk caused to enter the chamber by the vacuum therein. Thus, the milk, air, and steam are mixed together in said chamber and then discharged therefrom through said discharge port.

The passageways for the milk and the air are set apart from each other.

In one viable embodiment, the milk passageway is implemented by a small tube adapted to be dipped into a feed vessel or into the same container as is used to collect the emulsion and heat the milk, which is first filled with the amount of milk to be emulsified. The air passageway may also be implemented by a small tube for remote picking up with respect to the milk level.

In an advantageous embodiment, the chamber may comprise a sleeve encircling the steam nozzle and forming the emulsion discharge port in line therewith. The milk passageway may comprise, in this case, holes formed around the nozzle in the lower portion of the sleeve, and the air passageway in the upper portion of said sleeve.

The steam nozzle may be provided at the end of a small tube extending from a fitting and being surrounded by the sleeve; the sleeve may also be tubular and taper toward the axial port.

Advantageously, the sleeve may be made quickly disconnectable for cleaning convenience.

In actual practice, the nozzle tube may extend from a fitting over which the sleeve can be fitted in frictional engagement therewith, with the interposition of an annular retainer seal. In this case, the air passageway may comprise a groove cut in the inner wall of the sleeve at the area thereof which cooperates with said seal. At least one lug extending from the sleeve may be provided to define the proper location for tapping the emulsion into the container, through the latter being brought to rest against said lug.

BRIEF DESCRIPTION OF THE DRAWING

The accompanying drawing illustrates diagrammatically a non-limitative embodiment of the invention, as follows.

DESCRIPTION OF THE PREFERRED EMBODIMENT

Figure 1:
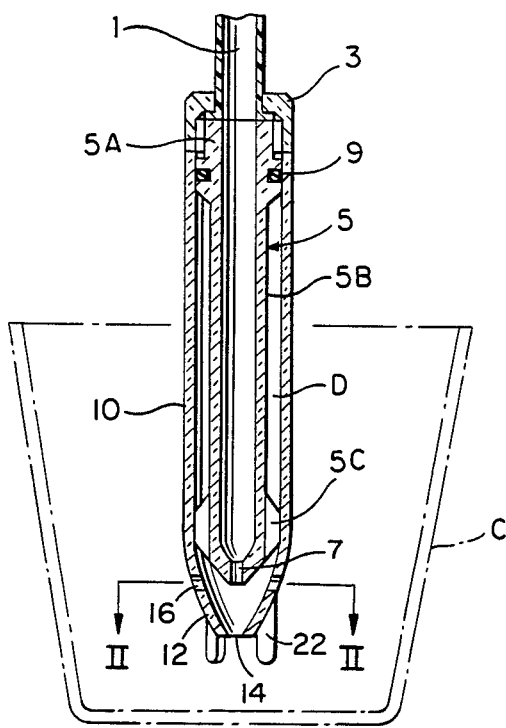
FIG. 1 is a general section view of the inventive device.
Figure 3:
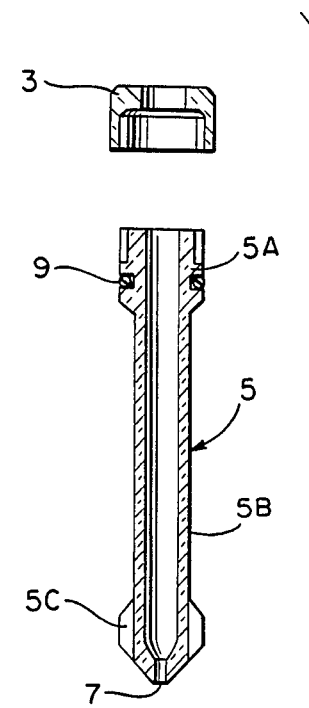
FIG. 3 is an exploded view of the device components as partly sectioned.
Figure 2:
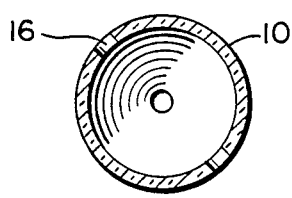
FIG. 2 is a fragmentary cross-section taken along the line II—II in FIG. 1.
Figure 4:
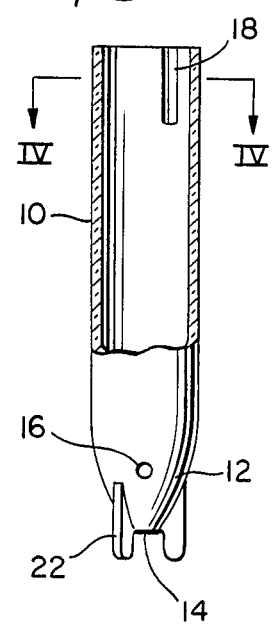
FIG. 4 is a fragmentary sectional view taken along along the line IV—IV in FIG. 3, and FIGS. 5 and 6 show two embodiment variants.
Figure 4:
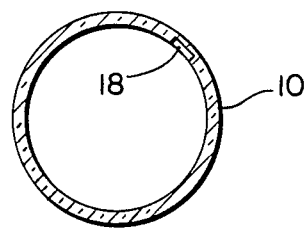

With reference to the accompanying drawing, indicated at 1 is a steam supply pipe equipping a machine for espresso coffee making, that pipe being in turn provided with a delivery control cock and with an optional flow rate and/or pressure regulator.

As shown in the drawing, a ring nut connector 3 is associated with the pipe 1 which provides a seal between the pipe 1 and a piece 5 intended to form the steam nozzle. The piece 5 has a head 5A adapted to engage with the ring nut 3 on the pipe 1, a relatively thin-walled tubular portion 5B which is finned at its downward portion as at 5C and shaped to form a nozzle 7 at its suitably shaped end for air and milk intake purposes, as explained hereinafter. The head 5A accommodates, in a specially provided groove, an annular seal 9 slightly protruding on the head periphery.

The reference numeral 10 designates a cylindrical tubular sleeve being terminated at the bottom with an ogival portion 12 having an axial port 14. The inside dimensions of the sleeve 10 are selected such that it can be fitted over the piece 5 in friction engagement with the seal 9 and centered around the fins 5C. The sleeve 10 has, as shown in the drawing, two passageways 16 in the form of radial holes in the area adjoining the ogival end. Furthermore, the sleeve 10 is formed with at least one groove 18 extending lengthwise across that area of the sleeve inner surface which cooperates with the seal 9; this groove 18 functions as a passageway for the air, with the sleeve 10 fitted over the piece 5 and thereon by frictional engagement with the seal 9. The sleeve 10 can be readily disassembled for cleaning and servicing.

With the sleeve 10 in its assembled state to the piece 5 (FIG. 1), even a comparatively small container C may be employed, with its portion 12 dipped into the milk contained in the container C such that the milk level locates somewhere between the holes 16 and the top end of the sleeve 10. On turning on the steam jet, the steam issuing from the nozzle 7 will create a vacuum in the chamber D confined between the sleeve 10 and the body 5; thus, milk will be drawn in through the holes 16 and air through the groove 18, an air, steam, and milk emulsion will form within the chamber, and the emulsion will be delivered through the axial port 14 to the milk mass. Accordingly, broken up air bubbles are introduced through the milk mass, which will emulsify with the air and become heated by the steam being supplied.

The operation involves no special skill, since the subject device is practically unaffected by the level at which both the container, and specifically the free surface of the milk contained therein, should be positioned. By means of appropriate lugs 22, one is enabled to determined the position of the container C by bringing the inner bottom thereof to bear against such lugs. The flow of air being drawn in is relatively small, and the admixing of air to relatively small amounts of milk occurs gradually, which all combines to permit convenient observation of the emulsion being formed within the container C, which emulsion will form progressively and, hence, be easy to monitor by even an unskilled operator.

FIG. 5 shows a modified embodiment, wherein a small tube 30 is connected to the or each hole 16 for drawing in the milk. This tube(s) is(are) arranged to draw the milk from the same container C whereinto the emulsion is discharged from the nozzle 14; accordingly, a continuous cycle of milk drawing and discharging, as well as of the emulsion that forms progressively, may be provided. Milk would be preferably drawn in from the bottom portion of the container, thereby milk yet to be emulsified is mainly drawn.

In the variant of FIG. 6, a small tube 40 can draw milk from a feed reservoir 8 separated from the emulsion collecting one C; in this case, the milk would not be cycled back, and heating would occur in a single pass.

The drawing illustrates the invention in a simplified form, that may vary both in shape and layout.

I claim:

1. A device for heating and emulsifying milk, for preparing "cappuccino", comprising nozzle means for discharging steam, conduit means connected to said nozzle means to lead steam thereto, means defining a vacuum chamber encircling said nozzle means, said means defining a vacuum chamber being provided with an emulsion discharge port, first passageway means connected to said means defining a vacuum chamber for drawing in air by suction created by a vacuum in said means defining a vacuum chamber and second passageway means connected to said means defining a vacuum chamber for drawing in milk by suction created by the vacuum in said means defining a vacuum chamber, so as to mix and emulsify milk, air, and steam together within said means defining a vacuum chamber and to deliver the resulting emulsified mixture out through said emulsion discharge port by the force of the steam.

2. A device as in claim 1, wherein the first and second passageway means are set apart from each other.

3. A device as in claim 1, wherein said second passageway means includes a small tube adapted to be dipped into a vessel containing milk.

4. A device as in claim 1, wherein said first passageway means comprises a small tube adapted for remote picking up of air.

5. A device as in claim 1, wherein said means defining a vacuum chamber comprises a sleeve encircling the steam nozzle means and has said emulsion discharge port in line with the steam nozzle means.

6. A device as in claim 5, wherein said second passageway means comprises a hole in the portion of said sleeve encircling the nozzle means and, said first passageway means is associated with a remote portion of said sleeve.

7. A device as in claim 5, wherein said steam nozzle means is formed at one end of a small tube extending from a fitting and is surrounded by said sleeve, and that said sleeve tapers and terminates at said emulsion discharge port which is in axial alignment with said nozzle means.

8. A device as in claim 5 wherein mounting means are provided for said sleeve to enable quick disconnection for cleaning convenience.

9. A device as in claim 7 wherein the nozzle tube extends from a fitting whereover said sleeve can be fitted in frictional engagement relationship, and an annular retainer seal cooperates with the sleeve and fitting.

10. A device as in claim 9 wherein said first passageway means comprises a groove cut in the inner wall of said sleeve to bypass the annular retainer seal.

11. A device as in claim 5 wherein at least one lug extends from said sleeve adjacent said emulsion discharge port to define the proper location for collecting discharged emulsion by a container brought to bear against said sleeve.

12. A device for heating and emulsifying milk for preparing cappuccino comprising a tube terminating at a first end in a nozzle and at a second end in a fitting provided with an annular seal, a cap for cooperating with said fitting to fix the second end of said tube in sealing engagement with a steam conduit, a sleeve defining a discharge port at a first end thereof and having a second end received over said tube and in frictional engagement with the annular seal of said fitting, said discharge port axially aligned with and lying spaced from said nozzle for said sleeve to define a vacuum chamber encircling said nozzle, means defining an air vent in said sleeve adjacent said second end, means defining a milk intake in said sleeve adjacent said first end axially spaced from said discharge port, and at least one lug extending from said sleeve beyond said first end thereof so that said device can be connected to a source of steam and be inserted into a container of milk to mix and emulsify the milk with air and steam. BD

* * * * *